UNITED STATES PATENT OFFICE.

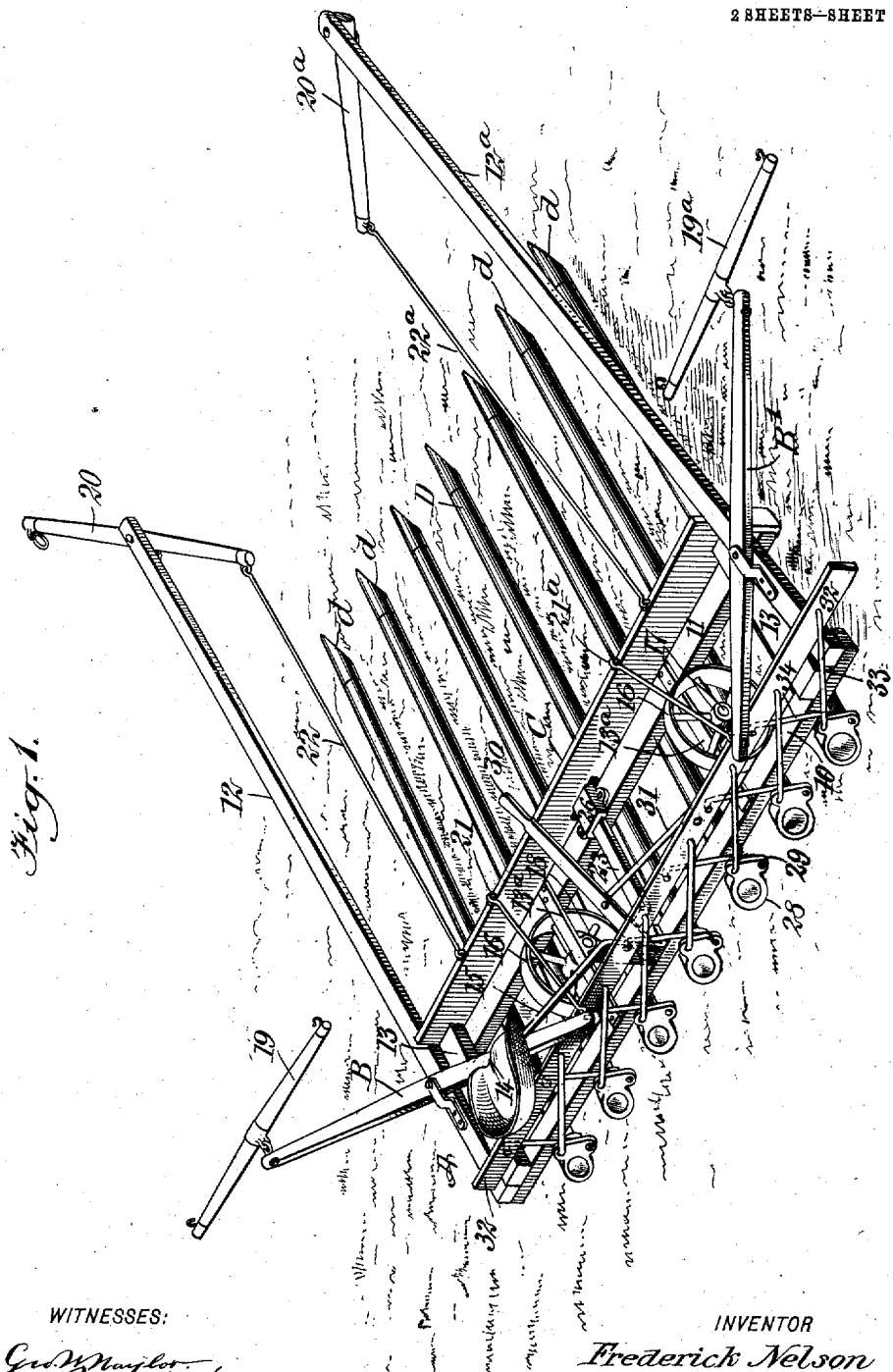

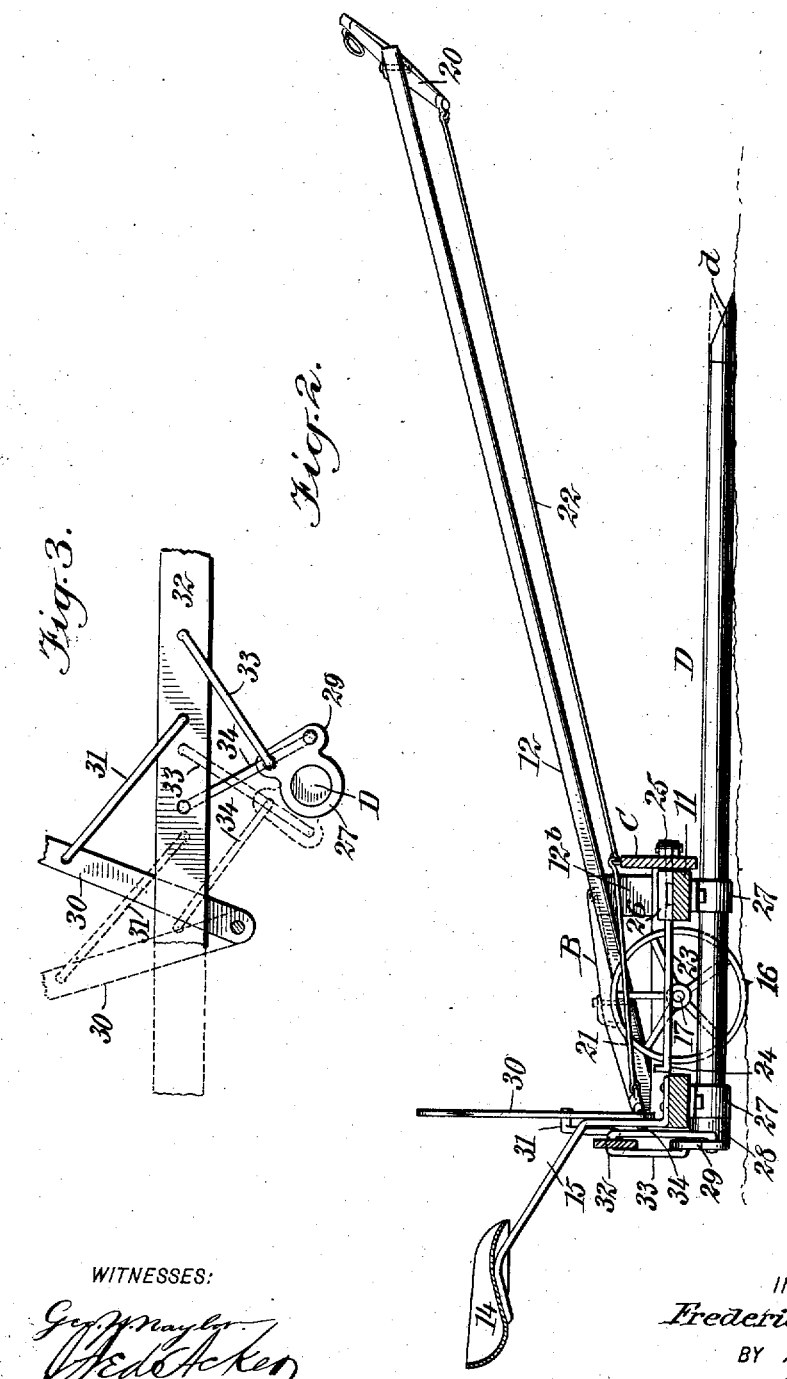

FREDERICK NELSON, OF DRISCOLL, NORTH DAKOTA.

SWEEP-RAKE.

No. 857,412.  Specification of Letters Patent.  Patented June 18, 1907.

Application filed February 26, 1906. Serial No. 303,005.

*To all whom it may concern:*

Be it known that I, FREDERICK NELSON, a citizen of the United States, and a resident of Driscoll, in the county of Burleigh and State of North Dakota, have invented a new and Improved Sweep-Rake, of which the following is a full, clear, and exact description.

The purpose of the invention is to provide a construction of rake wherein when the team is backed to discharge a load a sweep bar will be automatically drawn over the teeth to impart the initial movement to the load, and wherein further the moment the team is started forward or commences to pull the said sweep bar will be automatically restored to its normal position close to a rake head.

Another purpose of the invention is to so mount the rake teeth on the rake head that they may be turned on their bearings, and to bevel the forward ends of the teeth at one side, and also to provide means for simultaneously imparting to such teeth a half turn, or any desired fraction thereof, so as to adjust the points of the teeth to suit the character of the straw and the ground over which the rake is drawn.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a perspective view of the improved rake; Fig. 2 is a longitudinal section through the rake; and Fig. 3 is a detail rear elevation of a portion of the shifting mechanism for the teeth, and a rear view of one of the teeth connected with the said mechanism.

A represents the head of the rake, which head may be of any desired construction. As shown it consists of a rear beam 10, a forward beam 11 parallel with and suitably spaced from the rear beam, tongues or poles 12 and 12$^a$ which connect the said beams 10 and 11 at their ends, end sills 13 and intermediate connecting straps 13$^a$.

The tongues or poles 12 and 12$^a$ are given an upward and forward inclination and are spaced from the forward beam 10 by blocks 12$^b$ of suitable height. The head is supported a suitable distance above the ground by wheels 16, which turn upon axles 17 secured to brackets 18 at the under sides of the connecting straps 13$^a$. The seat 14 is located at the rear central portion of the head A, supported by a suitable bracket 15.

An evener B is centrally pivoted upon the tongue or pole 12 midway between the beams 10 and 11 of the head A, and a similar evener B$'$ is pivoted in like manner upon the pole or tongue 12$^a$. The swingletree 19 is connected with the outer end of the evener B, and a second swingletree 19$^a$ is connected with the outer end of the evener B$'$. A neck yoke 20 is centrally pivoted to the forward end of the pole or tongue 12, and a corresponding neck yoke 20$^a$ is pivoted to the forward end of the pole or tongue 12$^a$, said neck yoke being shown broken away at the outer end in Fig. 1.

In connection with the eveners B and B$'$ and the neck yokes 20 and 20$^a$, a sweep bar or board C is employed, adapted for sliding movement over the rake teeth D. The sweep bar or board C normally occupies a position close to the forward edge of the forward head beam 11, as is illustrated in Figs. 1 and 2, and a link 21 connects the inner end of the evener B with the sweep board, while a corresponding link 21$^a$ connects the said sweep board with the inner end of the evener B$'$, while a longer link 22 connects the inner end of the neck yoke 20 with the sweep board and a corresponding link 22$^a$ connects the inner end of the neck yoke 20$^a$ with the sweep board. It will thus be observed that the draft animals are harnessed one to the swingletree 19 and the outer end of the neck yoke 20, and the other to the swingletree 19$^a$ and the outer end of the neck yoke 20$^a$. In the operation of this portion of the rake, when the team is backed to discharge the hay from the rake the inner ends of the neck yokes are carried forward and likewise the inner ends of the eveners thereby causing the sweep board C to be drawn forward by the links 22 and 22$^a$ to start the load from off the rake teeth, while the rear links 21 and 21$^a$ are moved forward to permit the links 22 and 22$^a$ to act. After the rake has been relieved from its load and the team is started forward, the inner ends of the neck yokes resume their inwardly inclined position, shown in Fig. 1, and the inner ends of the eveners are carried rearward, thus causing the sweep board to be drawn back to its normal position, in which position it remains until the team is again backed.

In order to prevent the sweep board from assuming a diagonal position upon the teeth should one animal back and the other start forward when the rake has been stationary, a guide device is provided, consisting of a slide 23 having an upturned rear end 24, which slide is attached to the front central portion of the sweep board as is shown at 25 in Fig. 2, and said slide is made to loosely pass through a guide sleeve or recessed plate 26, secured upon the upper face of the forward beam 11 of the head.

The rake teeth D are preferably circular in cross section, and are inclined or beveled upon one side at their forward ends, as is shown at d in Figs. 1 and 2, rendering their forward terminals pointed. The said rake teeth are mounted to turn in bearings 27 secured to the under side of the beams 10 and 11 of the rake head, and extend to the rear edges of said head. Each rake tooth at its rear end has a sleeve or ferrule 28 secured thereon, and each ferrule at what is normally its upper portion is provided with an enlarged integral flange 29, as is shown in Figs. 1 and 3. All of the rake teeth are simultaneously turned in the same direction when desired by means of a shifting mechanism, which is as follows:

A hand lever 30 is fulcrumed upon the seat bracket 15, or any other convenient support, and said lever has a link connection 31 with a shifting bar 32 that extends transversely of the head of the rake at its rear, and said shifting bar is free to move endwise, actuated by the said lever 30.

The flange 29 of each tooth ferrule 28 is connected with the shifting bar 32 by two crossed links 33 and 34, one link, the link 33 for example, being connected with the left-hand end of a flange 29 and the other link 34 having connection with the right-hand end of the same flange; the links are then crossed, and their upper ends are connected with the shifting bar 32 as is shown in Figs. 1 and 3, it being understood that the connections between the links 33 and 34 and the flanges 29 and shifting bar 32 are pivotal connections. Thus by moving the shifting bar to the right or to the left the teeth are given a quarter turn and the relation of their beveled faces to the ground is changed. Therefore, when the rake is used in connection with loose and matted hay, rain-beaten hay, or on soft ground, the teeth D are turned to bring their beveled faces d facing the ground, as is shown by full lines in Fig. 1 and by dotted lines in Fig. 2; when working on hard ground the teeth are turned so as to bring their beveled faces upward, as is shown by positive lines in Fig. 2, and the teeth are turned with their beveled faces downward when going over ruts, or roads, or crossing fields, since when the teeth are in such position their forward ends can not dig into the ground, as is common with other forms of rake teeth. It is obvious that by means of the shifting mechanism described for the teeth, the teeth may be almost instantly changed in position at any time.

A ferrule or other device is placed upon the rake teeth to prevent them slipping rearward through the rake head. The guide device 25 permits the sweep board to move slightly at an angle so that it will not bind, but principally the sweep board moves straight forward and backward.

Having thus described my invention, I claim as new, and desire to secure by Letters Patent,—

1. A rake, a sweep board mounted for movement over the rake teeth, eveners pivoted at opposite sides of the rake at the rear of the teeth, extensions from the rake, neck yokes pivoted on said extensions at a point in advance of the teeth, a swingletree for each evener, and connections between the inner ends of the neck yokes and the sweep boards, and the inner ends of the eveners and the sweep board, whereby when a team is backed the sweep board is carried forward over the teeth, and when the team is started forward the sweep board is automatically carried rearward to its normal position.

2. In a rake, a head, teeth extending from the head, tongues extending from the ends of the head upwardly in direction of the points of the teeth, eveners fulcrumed on the rake head at its side portions, swingletrees connected with the outer ends of the eveners, neck yokes pivoted at the forward ends of the said tongues, a sweep board mounted to slide over the teeth, link connections between the inner ends of the neck yokes and the sweep board, and link connections between the inner ends of the eveners and the said sweep board.

3. In a rake, a head, teeth extending from the head, tongues extending from the ends of the head upwardly in direction of the points of the teeth, eveners fulcrumed on the rake head at its side portions, swingletrees connected with the outer ends of the eveners, neck yokes pivoted at the forward ends of the said tongues, a sweep board mounted to slide over the teeth, link connections between the inner ends of the neck yokes and the sweep board, and link connections between the inner ends of the eveners and said sweep board, a slide connected with the central portion of the sweep board, and a socket plate secured to the said head, through which the said slide passes, whereby to compel the sweep board to move straight forward or backward, under all conditions of usage.

4. A rake head and bearings secured to the under face of the rake head, teeth mounted to turn in said bearings, said teeth being beveled at one side at their outer ends, a shifting bar located above the rake head, an operating lever for said bar, and crossed link connections between the shifting bar and the rear end of each of the teeth.

5. The combination with a wheel-supported rake head and bearings located at the under face of the rake head, of teeth mounted to turn in the said bearings, the outer ends of the said teeth being beveled at one side, ferrules located at the rear ends of the said rake teeth, and an elongated flange located at the upper portion of each ferrule, a shifting bar having end movement over the rake head, links pivotally attached to each end of each flange, which links are crossed and pivotally connected with the shifting bar, a lever, and a link connection between the lever and the shifting bar.

6. The combination of a rake, tongues extending from the rake, eveners pivoted to the rake, devices connected with the tongues and eveners respectively for the attachment of the draft animals, a sweep board, connections between the said devices on the tongues and the sweep board, and connections between the eveners and the sweep board.

7. The combination with a rake, of a tongue extending from the rake, a sweep board slidably mounted upon the rake, an evener pivoted to the rake and having one end connected with the sweep board, a draft device connected to the other end of said evener, a draft device in advance of the evener and connected with the tongue, and a link connecting said device on the tongue with the sweep board.

8. The combination with a hay rake, of a sweep board slidably mounted upon the rake, a tongue extending forwardly from the rake, an evener fulcrumed to the rear portion of the tongue, a draft device connected with the outer end of said evener, a draft device fulcrumed to the front end of the tongue, a link pivoted to the inner end of the forward draft device and to the sweep board, and means for connecting the sweep board with the inner end of the evener.

9. The combination with a rake, and its supporting wheels, of a sweep board slidably mounted upon the tops of the rake teeth, tongues secured to the rake at opposite sides and extending forwardly therefrom, an evener fulcrumed to the rear portion of each tongue, a link connecting the inner end of each evener with the sweep board, a swingletree on the outer end of each evener, a draft attachment fulcrumed to the forward end of each tongue, and a link connected to the inner end of each of said draft attachments and also connected to the sweep board.

10. The combination with a hay rake, and its supporting wheels, of a sweep board slidably mounted upon the rake teeth, tongues secured to the rake at opposite sides and extending forwardly therefrom, an evener fulcrumed to the rear portion of each tongue, forwardly extending links connecting the inner ends of the eveners with the sweep board, a swingletree connected with the outer end of each evener, neck yokes pivoted at the forward ends of each tongue, and a rearwardly extending link connecting the inner end of each of said neck yokes with the said sweep board.

In testimony whereof I have signed my name to this specification in the presence of two subscribing witnesses.

FREDERICK NELSON.

Witnesses:
S. H. COONS,
FRANK WILTON.